Oct. 16, 1962 W. PECHY 3,058,615
HIGH SPEED ARTICLE-FEEDING DEVICE
Filed March 18, 1959 3 Sheets-Sheet 3

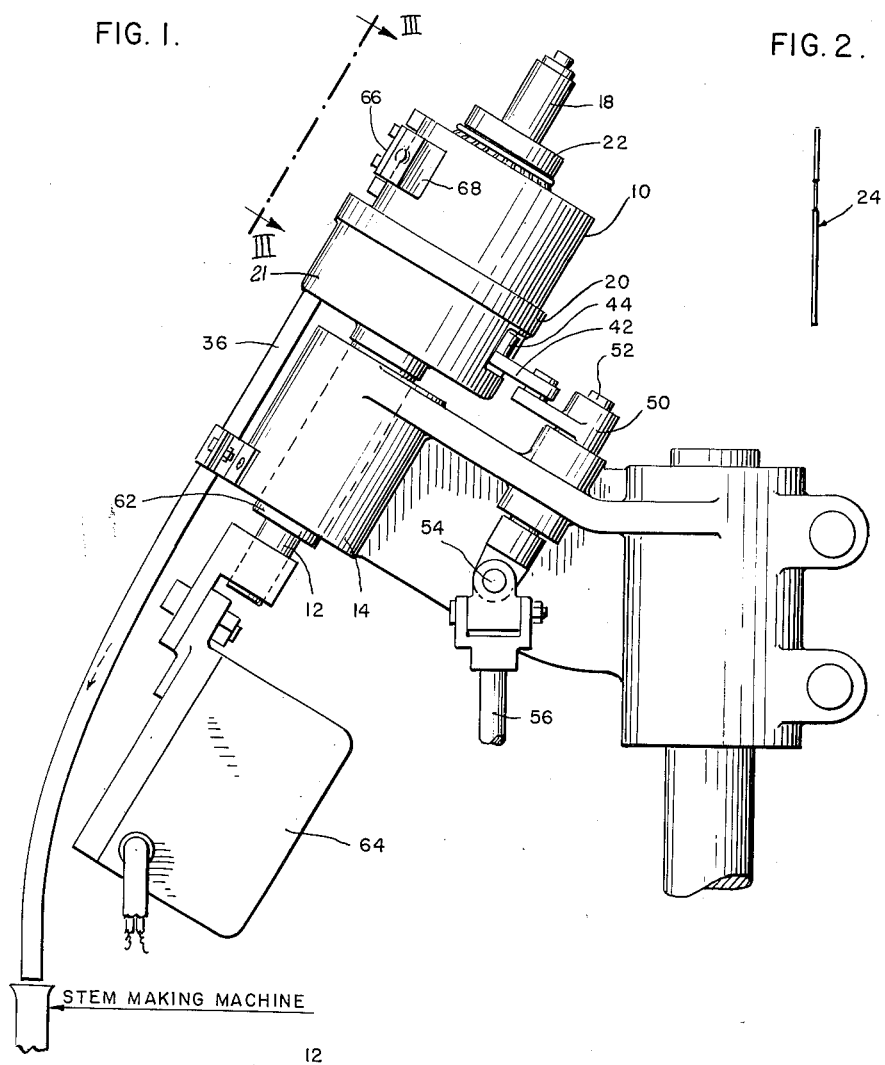

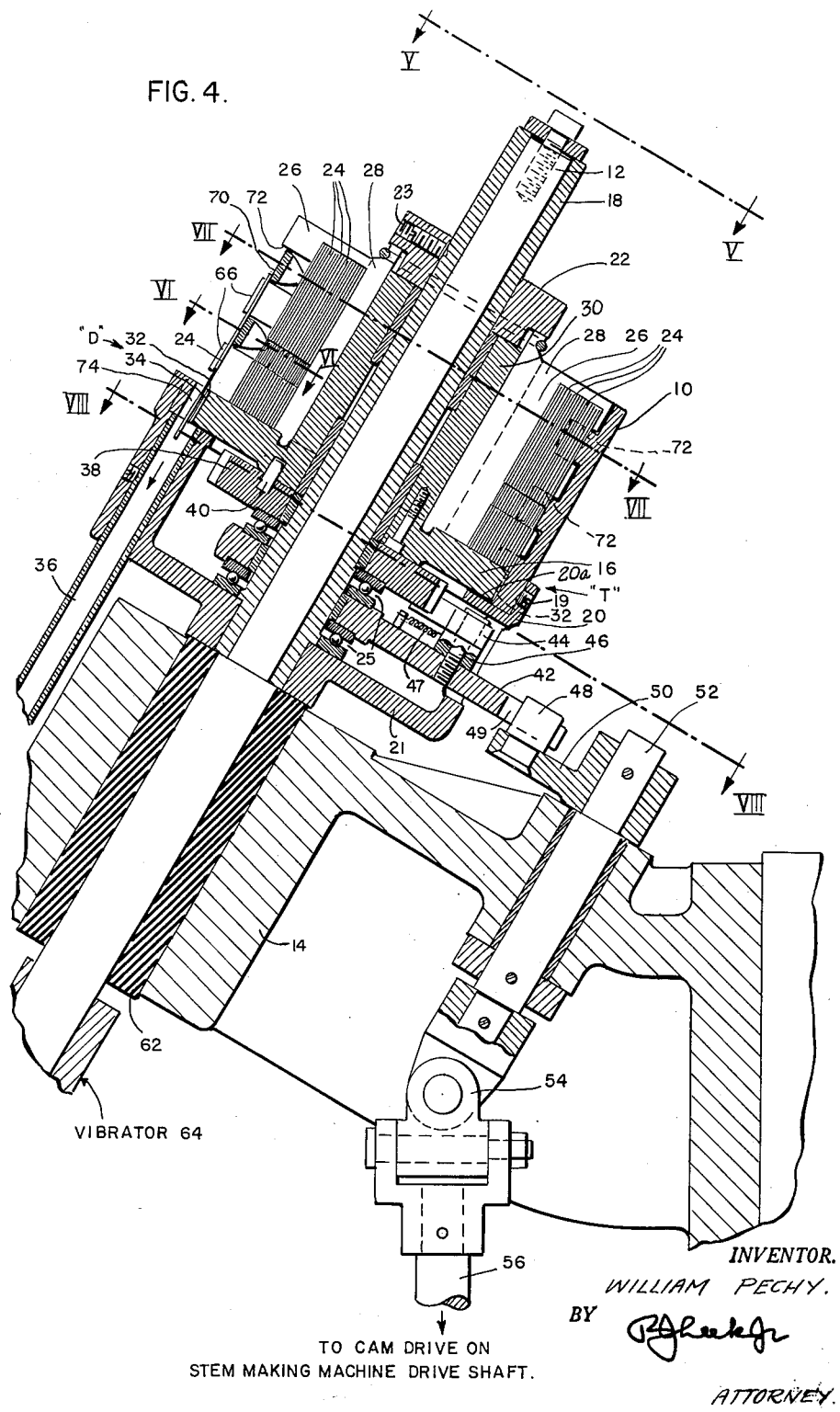

INVENTOR.
WILLIAM PECHY
BY
ATTORNEY.

United States Patent Office 3,058,615
Patented Oct. 16, 1962

3,058,615
HIGH SPEED ARTICLE-FEEDING DEVICE
William Pechy, Manasquan, N.J., assignor to Westinghouse Electric Corporation, East Pittsburgh, Pa., a corporation of Pennsylvania
Filed Mar. 18, 1959, Ser. No. 800,335
4 Claims. (Cl. 221—113)

The present invention relates to stem-making machines and, more particularly, to a high-speed lead-wire feeding device for such a machine.

Heretofore, lead wires have been fed to a turret-type stem-making machine (of the type shown in U. S. Patent No. 1,655,141, issued January 3, 1928, to J. T. Fagan et al.) by a lead-wire feeding device of the type shown in U. S. Patent No. 2,042,520, issued June 2, 1936, to J. Flaws, Jr., et al. In such a lead-wire feeding device a quantity of the lead wires are stored in a hopper and they are individually fed from the hopper to the weld pockets in the head of the stem-making machine by apparatus comprising a transfer member which selects one wire from the hopper, carries the lead wire away from the hopper to a delivery position where such lead wire is then released to fall onto and along an inclined channel and into a funnel member. The lead wire then gravitates through the funnel and through a vertically disposed movable guide tube leading to the weld pocket in the head of the stem-making machine. For indexing purposes this guide tube is reciprocated vertically to clear the head. The movement of the guide tube and the transfer member are effected by cam means synchronized with the indexing of the turret of the stem-making machine, which turret carries the heads. Hence the lead-wire feeding rate of the conventional lead-wire feeder is inherently limited to 1200 lead wires per hour by the time required for raising the guide tube, for the transfer member to move to the pick-up position and back to the delivery position, and for the released lead wire to slide down the channel, the funnel and the guide tube, into the weld pocket in the head of the stem-making machine.

The above-mentioned turret-type stem-making machine due to its rotating motion and relatively large weight is limited by the factors of momentum and inertia to index speeds of 1200 indexes per hour (and hence a production rate of 1200 stems per hour). Because of the stresses produced in this turret-type stem-making machine during its operation and the limits of current engineering materials, this production figure represents the maximum production rate for such a stem-making machine.

The above-mentioned limitations of the turret-type stem machines together with the demand for higher production has caused the substitution of a conveyor-type stem-making machine (of the type shown in U. S. Patent No. 2,637,144, issued May 5, 1953, to R. M. Gardner et al.) for the conventional turret-type stem-making machine. Such a conveyor-type stem-making machine (which carries a larger number of heads than the turret-type stem-making machine) is capable of producing 3600 stems per hour. It is apparent that the above-mentioned conventional lead-wire feeding device of the type shown in U. S. Patent No. 2,042,520 (which is limited to the feeding of about 1200 lead wires per hour) is obviously inadequate for use with the conveyor type stem-making machine.

Another disadvantage of conventional lead-wire feeding apparatus is that spurs or flash on the weld knots of the sectional lead wires often become entwined with the spurs on the weld knots on the other lead wires thus causing the transfer arm to feed more than one lead wire at a time. Further, due to the many moving parts of the conventional lead-wire feeding device, it is subject to wear and considerable maintenance. Such conventional lead-wire feeding device has the further disadvantage that due to its complexity of structure the elements of the device are not readily accessible for maintenance and inspection.

It is the general object of the present invention to avoid and overcome the foregoing and other difficulties and objections to prior art practices by the provision of a high-speed article-feeding device which operates reliably at an index rate which exceeds the index rate of improved conveyor-type fabricating machines, thereby permitting the construction of higher-speed conveyor-type machines having more fabricating heads.

Another object of the present invention is the provision of a high-speed article-feeding device which is simple and rugged in construction and is consistently accurate and efficient in its operation.

Yet another object of the present invention is the provision of a high-speed article-feeding device which can be readily adapted for use with elongated articles of any desired length.

Still another object of the present invention is the provision of a high-speed lead-wire feeding device which will not be affected by the presence of spurs on the weld knots of the lead wires during its operation.

The aforesaid objects of the present invention and other objects which will become apparent as the description proceeds are achieved by providing a high-speed article-feeding device comprising a rotor inclined from the vertical and provided with means for containing elongated articles in a generally vertical position and with a plurality of slots disposed on the periphery of the rotor and into which an individual article may be deposited. Such device is also provided with vibratory means connected to the rotor for maintaining the articles in a rolling fluid state, and rotating means associated with the rotor for moving the latter from an article-trapping position where one of the vibrated articles under the influence of gravity is positioned in a peripheral slot to an article-delivery position where means adjacent the article-delivery position remove the trapped article from the peripheral slot and causes it to fall through a guide tube disposed at the article-delivery position and into a head of an article-fabricating machine.

For a better understanding of the invention reference should be had to the accompanying drawings, wherein like numerals of reference indicate similar parts throughout the several views and wherein:

FIG. 1 is a side-elevational view of the high-speed lead-wire feeding device of the present invention disposed at a lead-wire feeding station of a conveyor-type stem-making machine.

FIG. 2 is a side-elevational view of a sectional lead wire of the type fed to the conveyor-type stem-making machine by the high-speed lead-wire feeding device shown in FIG. 1.

FIG. 3 is an enlarged, fragmentary, front-elevational view taken along the line III—III of FIG. 1 in the direction of the arrows and showing the portion of a rotor of the high-speed lead-wire feeding device adjacent a lead-wire delivery position and further showing the means for removing a trapped lead wire from a trapping means.

FIG. 4 is an enlarged, fragmentary, vertical-sectional view of the high-speed lead-wire feeding device and showing the details of the rotor of the device and a drive means for such rotor.

Figure 5:
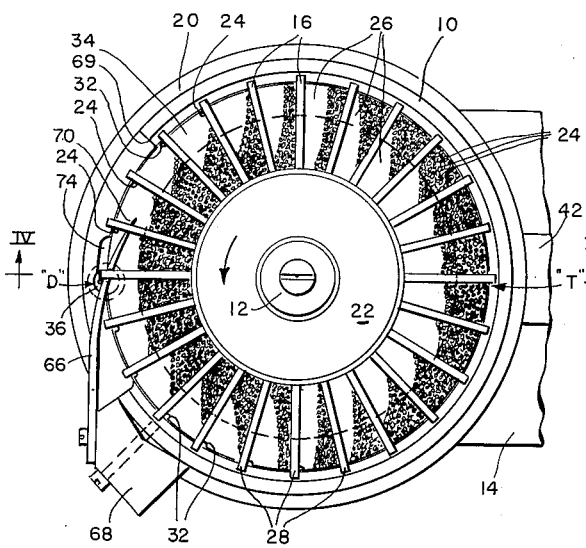
FIG. 5 is a fragmentary, plan view taken along the line V—V of FIG. 4 in the direction of the arrows.

Although the principles of the present invention are broadly applicable to the high-speed feeding of elongated articles to an article-fabricating machine, the present invention is particularly adapted for use in conjunction with the high-speed feeding of lead wires to a conveyor-type stem-making machine and hence it has been so illustrated and will be so described.

With specific reference to the form of the present invention illustrated in the drawings, and referring particularly to FIG. 1, a generally cylindrical housing for the high-speed lead-wire feeding device of the present invention, indicated generally by the reference numeral 10, is mounted on an inclined post 12 upstanding from a frame 14, which frame is disposed adjacent a lead-wire feeding station of a conveyor-type stem-making machine (not shown, but of the type described in the above-mentioned U.S. Patent No. 2,637,144). The post 12 is inclined from the vertical for a purpose hereinafter to be related.

This high-speel lead-wire feeding device of the present invention has a rotor 16 which is rotatable with respect to the housing 10 on an inner hub portion 18 (FIG. 4). This housing 10 is secured by a set screw 19 in an outer peripheral ring-like portion 20 of a fixed lower support 21 for the inner hub portion 18 and the thrust bearings 25 for the rotor 16. This rotor 16 is retained in such rotatable engagement by a collar 22 secured to the inner hub portion 18 by means of a set screw 23.

In order to adapt the rotor 16 to receive a plurality of sectional lead wires 24 (of the type shown in FIG. 2) in generally vertical position (FIGS. 3 and 4) and to maintain these sectional lead wires 24 in such position during the rotation of the rotor 16, it is divided into a plurality of lead-wire-receiving compartments 26 (FIG. 5) by a plurality of radially disposed plates or vanes 28 extending from a hub or axial portion 30 of the rotor 16 to the periphery of the latter and with the stationary housing 10 serving as the outer wall of the compartments 26. Each lead-wire-receiving compartment 26 of the rotor 16 is provided with a vertically disposed trapping slot 32 located adjacent the periphery of the rotor 16 in the outer left-hand corner of each such compartment 26, as viewed from outside of rotor 16 in FIGS. 5, 6 and 7, which trapping slot 32 extends through a basal portion 34 of the rotor 16.

Figure 6:
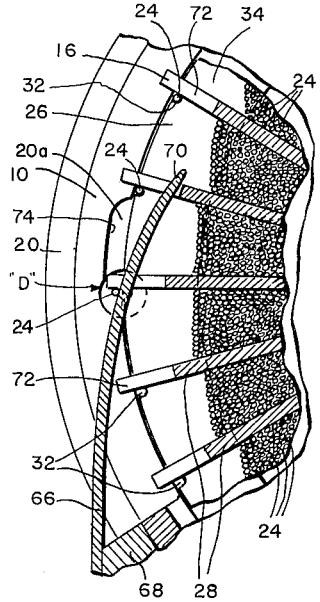
FIG. 6 is an enlarged, fragmentary, horizontal-sectional view taken on the line VI—VI of FIG. 4 showing the rotor and means for removing a trapped lead wire from the trapping means adjacent the lead-wire delivery position.
Figure 7:
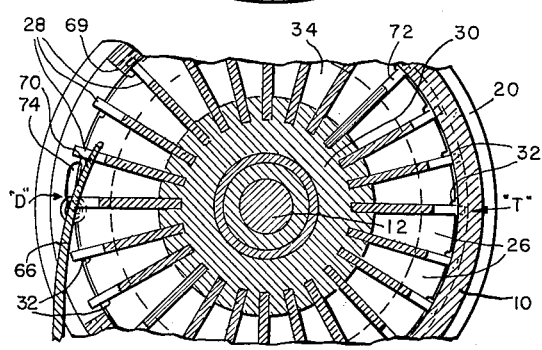
FIG. 7 is a horizontal-sectional view taken along the line VII—VII of FIG. 4 in the direction of the arrows and showing means provided in the rotor for maintaining the lead wires therewithin in a substantially vertical position.

It will be understood from a consideration of FIGS. 4, 5 and 7 that the rotor 16 is movable in counterclockwise direction, when viewed in such figures, from a lead-wire trapping position indicated generally by "T" (FIGS. 5 and 7) to a lead-wire delivery position "D" and back to position "T." At the lead-wire trapping position "T" the sectional lead wires 24 gravitate toward the trapping slot 32 in the lead-wire-receiving compartment 26 so that one sectional lead wire 24 slides off the basal portion 34 and into the trapping slot 32. The bottom of the trapped lead wire 24 is supported by a flange 20a (FIGS. 1 and 3) on the ring-like portion 20. Adjacent the article-delivery position "D," the sectional lead wires 24 in the lead-wire-receiving compartment 26 move under the influence of gravity away from the trapped sectional lead wire 24 in the trapping slot 32 thereby preventing spurs on the weld knots of the untrapped sectional lead wires from being caught on the spurs on the weld knot of the trapped lead wire 24 and preventing the removal of such trapped lead wire from the trapping slot 32 as hereinafter explained.

In order to index the rotor 16 through the lead-wire trapping position "T" and the lead wire delivery position "D," a ratchet wheel 38 (rotatably mounted on the hub portion 18) is connected by a pin 40 to the basal portion 34 of the rotor 16 and a pawl arm 42 (similarly rotatable on the hub portion 18) is provided with an advancing pawl 44. This advancing pawl 44 is pivoted on the pawl arm 42 at 46, FIG. 8, and spring-biased by a spring 47 into engagement with ratchet wheel 38. In addition, a roller 48 on a drive arm 50 rides in an open ended slot 49 in the pawl arm 42. The drive arm 50 is mounted on a driven shaft 52 coupled by a universal joint 54 to a drive shaft 56, which drive shaft 56 is driven by cam means (not shown) on a drive shaft (not shown) of the stem-making machine (not shown) and of the type disclosed in U.S. Patent No. 2,637,144. By utilization of the above described drive means, the operation of applicant's improved feeding apparatus is synchronized with the operation of the stem machine in the conventional manner.

Figure 8:
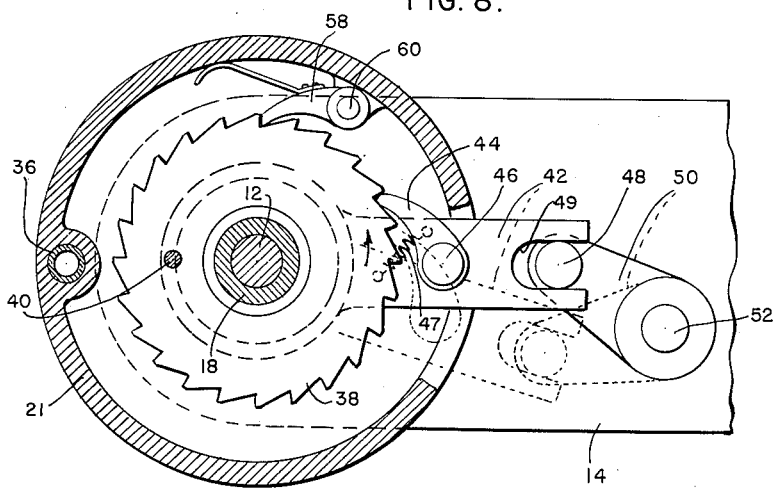
FIG. 8 is a horizontal-sectional view taken along the line VIII—VIII of FIG. 4 of the drive means for the rotor.

It will be understood from a consideration of FIGS. 4 and 8 that every time the stem-making machine indexes, the above-described linkage causes movement of the pawl arm 42 from the retracted or dotted-line position, shown in FIG. 8, to the advanced or solid-line position, shown in such figure thereby causing the advancing pawl 44 to advance the ratchet wheel 38 in counterclockwise direction with attendant similar counterclockwise movement of the rotor 16 one compartment length per index. During this advancing movement of the drive means, a locking pawl 58 (pivoted at 60 on the frame 14 and spring-biased into engagement with the ratchet wheel 38) slides off an engaged tooth of the ratchet wheel 38 thereby permitting the above-described counterclockwise indexing movement of the rotor 16. Between indexing movement of the stem-making machine (not shown) and the rotor 16, the pawl arm 42 is retracted from the advanced or solid-line position, shown in FIG. 8, to the retracted or dotted-line position shown in such figure, by further operation of the drive means. During this retracting movement of the pawl arm 42, the ratchet wheel 38 is held in the advanced position by the locking pawl 58 and the advancing pawl 44 is retracted in clockwise direction, as viewed in FIG. 8, into engagement with the next tooth on the ratchet wheel 38, preparatory for the next indexing movement of the drive means.

Referring now to FIGS. 1 and 4, it will be noted that the inclined post 12 is mounted in the frame 14 by means of a shock-absorbing resilient sleeve 62, suitably rubber, and has its lower end portion, as viewed in such figures connected to a vibrator 64 of the type shown in U.S. Patent No. 2,539,391, issued Jan. 30, 1951, to G. D. Alvord. This vibrator 64 continuously vibrates or reciprocates the post 12 and the rotor 16 in a substantially longitudinal direction parallel to the post 12 (with respect to the frame 14) by means of the resilient sleeve 62 and maintains the sectional lead wires 24 in a rolling fluid state thereby further preventing any spurs on the weld knots of the sectional lead wires 24 in the compartment 26 from sticking together and also facilitating the trapping of a single sectional lead wire 24 in a trapping slot 32 when the associated compartment 26 is adjacent the lead-wire-trapping position "T."

For the purpose of insuring the successful removal of a trapped sectional lead wire 24 from a trapping slot 32 when the associated compartment 26 arrives at the lead-wire delivery position "D," a bifurcated pick-off plate 66 (FIGS. 1, 3, 4, 5, 6 and 7) is mounted at 68 on the housing 10 and has two pick-off fingers 70 extending through a cut-away portion 69 in the housing 10 and inwardly with respect to the rotor 16 into a receiving aperture, such as pick-off finger receiving slots 72 provided in the periphery of the partitions 28. As a trapped sectional lead wire 24 in the trapping groove 32 approaches the lead-wire delivery position "D" (FIG. 5), such trapped sectional lead wire 24 is in front of the leading edge of the pick-off fingers 70 (FIGS. 5 and 6) and becomes positioned in communication with an article-clearance aperture, such as a clearance slot 74, provided in the periphery of the frame 14 and leading to the delivery chute 36. This clearance slot 74 is employed to provide space for the trapped sectional lead wire 24 to be moved out of the trapping slot 32 upon the eventual engagement thereof by the pick-off fingers 70 when such trapped sectional lead wire 24 arrives at the lead-wire delivery position "D," FIG. 6. While the lead wire 24 is in the clearance slot 74, such lead wire 24 is supported by the flange 20a until such lead wire comes into registry with the delivery chute 36. After the positive removal of the sectional lead wire 24 from the trapping slot 32 by the above-described operation of the pick-off fingers 70 in causing it to move into the clearance slot 74, such released or removed sectional lead wire 24 then falls downwardly through the inlet portion of the delivery chute 36 and then to the stem-making machine (not shown).

It will be apparent to those skilled in the art that the above-described high-speed lead-wire feeding device of the present invention may be readily adapted for use with lead wires of any length by the provision of an assortment of rotors similar to the above-described rotor 16, but varying in height to accommodate a particular length of sectional lead wires. These rotors, as indicated in FIG. 4, should have a height sufficiently greater than the length of the lead wires which are to be fed, in order that such lead wires may be contained within the lead-wire-receiving compartments 26 in substantially the same generally vertical position. In order to replace a rotor 16, the collar 22 is loosed and removed from the inclined post 12 and the rotor 16 is raised from the pin 40 and the inclined post 12 by sliding it upwardly. The new rotor 16 is then slid down over the inclined post 12 and the registering aperture provided in its basal portion 34 is adjusted to receive the upper portion of the pin 40. The collar 22 is replaced on the inclined post 12 and secured thereto to retain the replacement rotor 16 in rotatable engagement with the housing 10.

It will be recognized by those skilled in the art that the objects of the present invention have been achieved by providing a high-speed article-feeding device which operates reliably at an index rate of about 5000 indexes per hour, thereby exceeding the index rate, namely, of 3600 indexes per hour of currently employed conveyor-type fabricating machines thereby permitting the construction of higher speed conveyor-type fabricating machines provided with more article-fabricating heads. Moreover, the high-speed article-feeding device of the present invention is simple and rugged in construction and is consistently accurate and efficient in its operation. In addition, such high-speed article-feeding device can be readily adapted for use with elongated articles of any length. Significantly, however, when the subject feeding device is employed to feed sectional lead wires, it is not affected in its operation by the presence of spurs on the weld knots of the lead wires being fed to a stem-making machine.

While in accordance with the patent statutes one best-known embodiment of the invention has been illustrated and described in detail, it is to be particularly understood that the invention is not limited thereto or thereby.

I claim:
1. Apparatus for feeding elongated articles, said apparatus comprising,
   a. an article receiving means having a peripheral portion and an axis inclined from the vertical,
   b. a plurality of article receiving compartments in said article receiving means, each of said article receiving compartments having such configuration as to contain a plurality of articles in a disposition which generally parallels said axis,
   c. drive means operable to rotate said article receiving means about said axis,
   d. vibratory means operatively associated with said article receiving means to continuously vibrate said article receiving means to maintain articles contained therein in a fluid state,
   e. said article receiving means when rotated about said axis by said drive means causing articles contained therein to gravitate with such rotation first toward said peripheral portion and then toward said axis,
   f. a plurality of trapping means disposed proximate to said peripheral portion, one of each of said trapping means forming a part of each of said article receiving compartments, each of said trapping means operable to trap and retain one of the elongated articles contained in said article receiving compartments when such articles are caused to gravitate toward said peripheral portion by the rotation of said article receiving means,
   g. an article delivering means having an article inlet disposed proximate to said peripheral portion at a point proximate to where untrapped articles contained in said article receiving compartments are caused to gravitate toward said axis by the rotation of said article receiving means, and
   h. an article releasing means disposed proximate both to said peripheral portion and said article delivering means and operable sequentially to release each article retained by said trapping means to said article delivering means as said peripheral portion of said article receiving means is rotated by said drive means proximate to said article delivering means.

2. The apparatus as specified in claim 1, wherein said article receiving means comprises a rotor having said article receiving compartments therein, and said drive means comprises an indexing means.

3. The apparatus as specified in claim 2, wherein each of said article trapping means comprises a receiving slot, and each said receiving slot is conformed to maintain any article retained therein in a disposition which generally parallels the axis of said article receiving means.

4. The apparatus as specified in claim 2, wherein said article releasing means comprises both an aperture positioned below said rotor and above said article delivering means and bifurcated fingers stationary with respect to said rotor, and said fingers are operable to contact an article retained in said article trapping means to forcibly remove and insure release of any article retained in said trapping means.

References Cited in the file of this patent
UNITED STATES PATENTS

| | | |
|---|---|---|
| 913,978 | Porter et al. | Mar. 2, 1909 |
| 1,069,724 | Pullon | Aug. 12, 1913 |
| 1,588,594 | Lawson et al. | June 15, 1926 |
| 1,867,418 | Muller et al. | July 12, 1932 |
| 2,371,126 | Best et al. | Mar. 13, 1945 |
| 2,695,730 | Cavanagh | Nov. 30, 1954 |